(No Model.)

F. R. BRAMAN.
STOVEPIPE JOINT.

No. 521,875. Patented June 26, 1894.

Witnesses
B. S. Ober
O. E. Doyle

Inventor
Frank R. Braman,
By his Attorneys.
C. A. Snow & Co.

THE NATIONAL LITHOGRAPHING COMPANY,
WASHINGTON, D. C.

UNITED STATES PATENT OFFICE.

FRANK R. BRAMAN, OF SALTILLOVILLE, INDIANA.

STOVEPIPE-JOINT.

SPECIFICATION forming part of Letters Patent No. 521,875, dated June 26, 1894.

Application filed January 23, 1894. Serial No. 497,797. (No model.)

*To all whom it may concern:*

Be it known that I, FRANK R. BRAMAN, a citizen of the United States, residing at Saltilloville, in the county of Washington and State of Indiana, have invented a new and useful Stovepipe-Joint, of which the following is a specification.

My invention relates to improvements in pipe joints, and has special reference to means for connecting sections or lengths of stove-pipe, the objects in view being to provide a simple, inexpensive, and efficient means for adjusting the length of a pipe composed of a series of lengths or sections, and for locking such lengths or sections at the desired extension; and furthermore, to provide a construction which does not involve other than a minor change in the formation of the pipe, whereby the invention may be applied with facility to an ordinary stove-pipe.

Further objects and advantages of this invention will appear in the following description, and the novel features thereof will be particularly pointed out in the appended claim.

Figure 1:
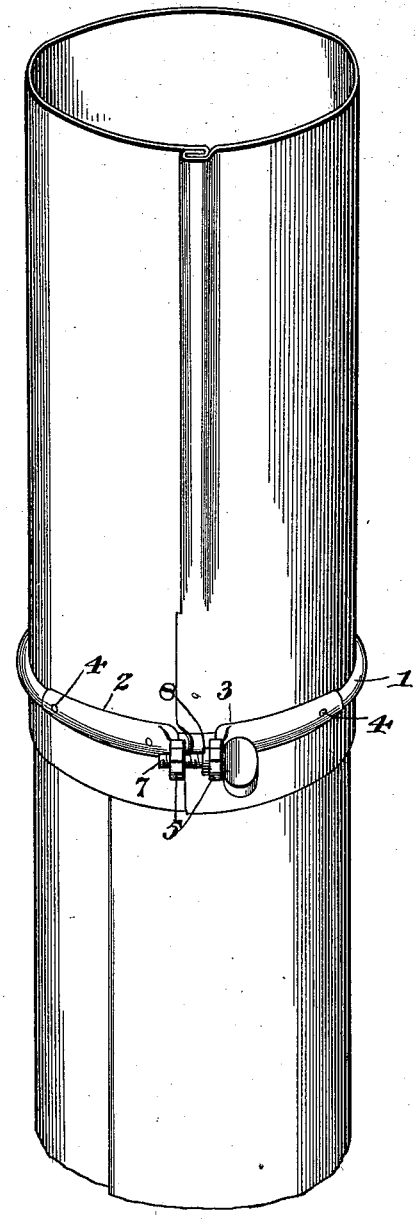
Figure 2:
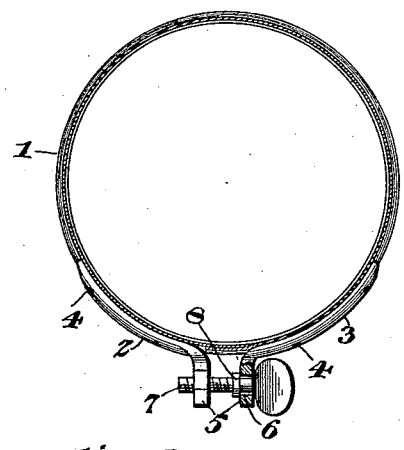

In the drawings, Figure 1 is a perspective view of a joint embodying my invention. Fig. 2 is a transverse section of the pipe, showing the attachment in plan.

Similar numerals of reference indicate corresponding parts in the several figures of the drawings.

One end of each section or length of pipe, which I will for convenience term the "receiving end," is expansible, the edges of the sheet forming such receiving end being unconnected. The edges of the main portion of the sheet forming the pipe may be connected in the usual or any preferred manner, as by soldering, rolling, or otherwise; and this fastening or means of connection is terminated a short distance from the receiving end of the section to allow for expansion and contraction. The expansible portion of the section is provided with a bead 1, which strengthens and adds to the durability of the receiving end of the pipe; and in addition thereto, forms a convenient projection for the attachment of the members 2 and 3 of the clamp or locking device. Said members are curved longitudinally to agree with the curvature of the pipe, and are concaved transversely to receive and fit over the bead 1, to which they are riveted, as shown at 4. The members of the clamp terminate at their inner or contiguous ends in the eyes or jaws 5, one of which is provided with a smooth perforation 6, for the reception of the shank of the thumb-screw 7, and the other of which is provided with a threaded perforation with which the thumb-screw engages. The thumb-screw is provided upon the inner side of the eye or jaw carried by the member 3, with a collar 8, whereby by a loosening or reverse movement of the thumb-screw the receiving end of the section or length of pipe may be positively expanded to loosen the inner or received section or length of pipe to allow movement of the latter to attain the desired longitudinal relative adjustment of the connected sections or lengths.

It will be seen that the only difference in the construction of the pipe necessitated by my improvement is that the connection between the edges of the sheet forming the pipe is terminated a short distance from the receiving end of the pipe, to provide an expansible receiving end. This receiving end is then beaded and the members of the clamp are attached to the portions of the bead adjacent to the unconnected edges of the sheet, said bead strengthening the receiving end by giving it stiffness and increasing the material at the point subjected to the strain of the clamp. Furthermore, said bead forms a convenient projection for the attachment of the members of the clamp and enables the rivets to be headed upon the inner surface of the pipe without interfering with the free insertion of the end of the connected section or length.

Various changes in the form, proportion, and the minor details of construction may be resorted to without departing from the principle or sacrificing any of the advantages of this invention.

Having described my invention, what I claim is—

In a pipe joint, the combination of a section or length of pipe constructed of sheet metal, having its edges secured together to within a short distance of the receiving end of the section or length to form an expansible receiving end provided with an encircling exterior bead 1, and a clamp having relatively adjustable members secured to the said bead adjacent to the free edges of said receiving end, and connected by an adjusting screw the inner ends of the securing devices for the members being arranged in the concavity of the bead to avoid obstructing the bore of the section of pipe, substantially as specified.

In testimony that I claim the foregoing as my own I have hereto affixed my signature in the presence of two witnesses.

FRANK R. BRAMAN.

Witnesses:
WM. A. CLIFTON,
REBECCA A. SMITH.